United States Patent [19]
Zalewski

[11] Patent Number: 5,340,974
[45] Date of Patent: Aug. 23, 1994

[54] POLYCHROMATIC SOURCE CALIBRATION BY ONE OR MORE SPECTRALLY FILTERED PHOTODETECTOR CURRENTS

[75] Inventor: Edward F. Zalewski, Sandy Hook, Conn.

[73] Assignee: Hughes Aircraft Company, Los Angeles, Calif.

[21] Appl. No.: 805,445

[22] Filed: Dec. 9, 1991

[51] Int. Cl.$^5$ ............................................. G01J 1/32
[52] U.S. Cl. .................................. 250/205; 250/226; 315/158
[58] Field of Search ............... 250/205, 226, 225, 228; 356/236, 225, 229, 233; 315/158

[56] References Cited

U.S. PATENT DOCUMENTS

| | | | |
|---|---|---|---|
| 3,945,731 | 3/1976 | Graser, Jr. | 250/205 |
| 3,996,494 | 12/1976 | Suga | 250/205 |
| 4,310,249 | 1/1982 | Kramer | 250/228 |
| 4,737,029 | 4/1988 | Yabusaki et al. | 356/233 |

Primary Examiner—David C. Nelms
Assistant Examiner—K. Shami
Attorney, Agent, or Firm—Michael W. Sales; Wanda K. Denson-Low

[57] ABSTRACT

A light source (12) emits radiation which is maintained at a desired intensity by use of a photodetector which views the radiation and has a fixed relationship between incident radiation and output photodetector (18) current. Intensity of the radiation is established by varying electric current applied to the source, via a feedback loop (42, 24, 22, 34), to attain a reference value of the photodetector current, the photodetector current being representative of the desired value of radiation intensity. This procedure may be performed first in an air environment with a specific optical assembly of source and photodetector to establish the reference value of photodetector current for a desired value of radiation intensity. Thereupon, the optical system may be operated in a vacuum environment, and a monitoring of the photodetector current establishes the desired value of radiation intensity. Alternatively, the source is operated at a fixed value of excitation current, and an iris (44) or other radiation attenuator is operated to produce the reference value of photodetector current.

16 Claims, 3 Drawing Sheets

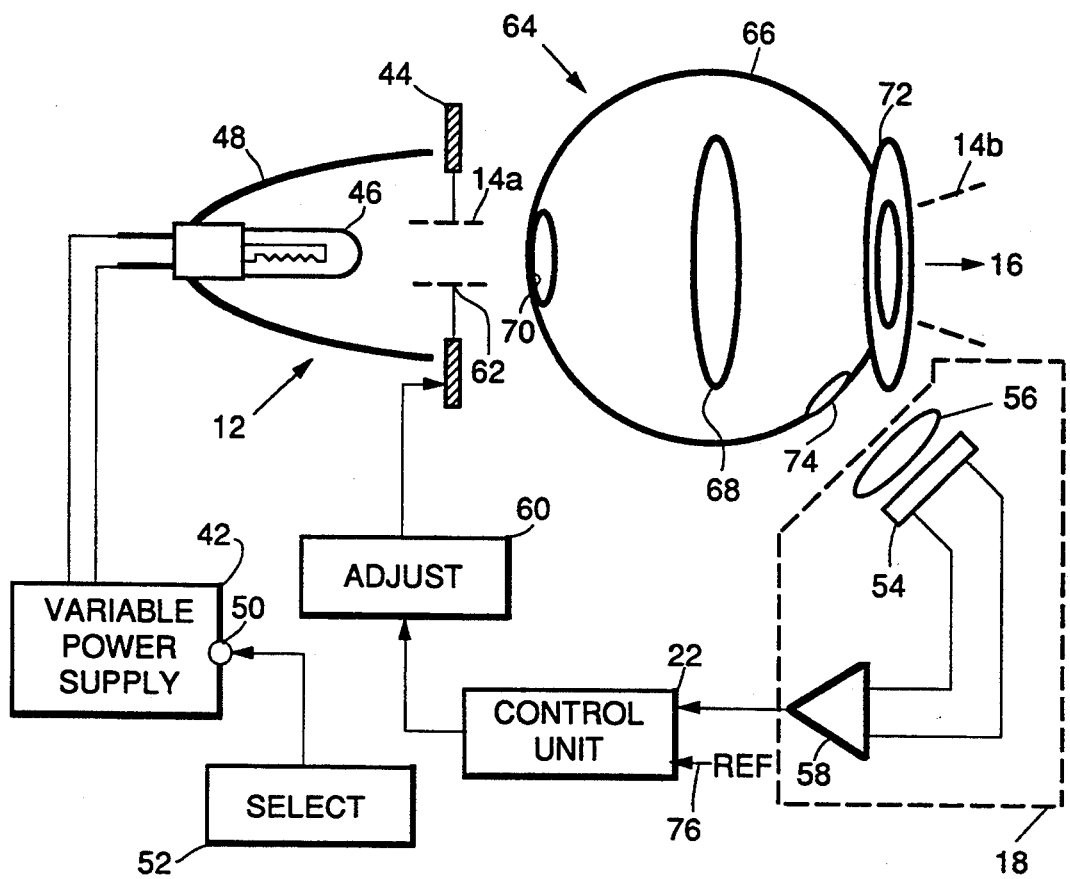
FIG. 3.
FIG. 4.
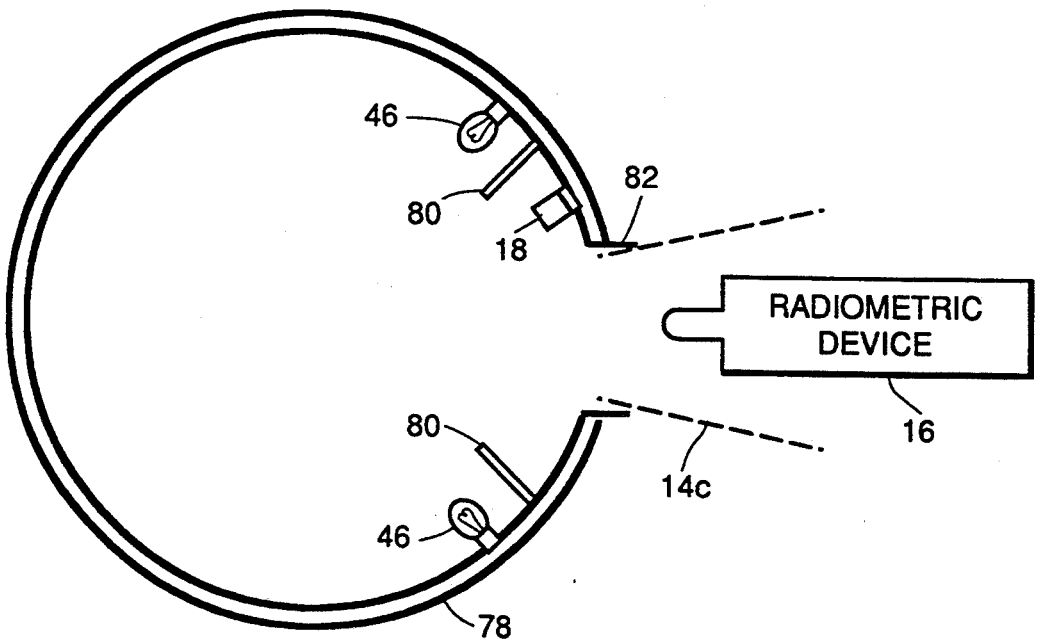

POLYCHROMATIC SOURCE CALIBRATION BY ONE OR MORE SPECTRALLY FILTERED PHOTODETECTOR CURRENTS

BACKGROUND OF THE INVENTION

This invention relates to the calibration of spectroradiometric instruments and, more particularly, to the calibration of a spectroradiometric standard light source by monitoring one or more photodetector currents outputted by one or more spectrally filtered photodetectors viewing separate spectral bands of radiation outputted by the light source.

A calibration of polychromatic light sources ranging in spectral content from the near ultraviolet with wavelength of approximately 200 nanometers to short wave infrared radiation of wavelength of approximately 2500 nanometers is important for numerous applications including the use of light sources in industry and in laboratories, as well as on spacecraft, by way of example. The term light, as used herein, is understood to include radiation throughout the above-noted spectral range of interest. Space-borne applications for source calibration introduce constraints and difficulties for the calibration process which generally are not found in calibration situations in land-based laboratory calibration of light sources.

Absolute spectroradiometric calibration for a space-borne imaging radiometer usually requires that the calibration be performed at power levels different by several orders of magnitude from that of available standards. This requires precise dynamic range for a standard source capable of outputting radiation at different power levels. One method of altering the intensity of the radiant energy received from a light source is to vary the distance between the source and a receiver of the radiation. However, this procedure assumes an idealized inverse-square law for establishing the intensity of the received radiation. In practice, there are deviations from the inverse-square relationship because of the geometry of the source as well as other factors in the laboratory environment. A further disadvantage in the use of the variation of distance to control power level is the need for a significant increase in the amount of space available for conducting the calibration. Thus, to some extent, the use of a varying distance may be impractical and, furthermore, there may be insufficient precision for calibration when a variable intensity is required.

A further aspect in the attainment of a reliable and stable source of light is the fact that the reference source is operated with a preset amount of current and voltage applied for outputting a reference intensity of radiation. This is based on the presumption that the reference intensity of radiation, attained previously during a calibration procedure with the preset amount of current and voltage, is still valid for later uses of the light source. However, there is an unpredictable drift with time so that, at later usage of the light source, the intensity and spectral distribution may be different, even though the preset amount of current and voltage is being applied for activating the light source. Thus, reliance solely on the values of input electric current and voltage to the light source does not assure adequate precision of calibration of spectroradiometric instruments where high accuracy is required.

A further problem arises, particularly in the spacecraft environment, wherein the light source is operated in a vacuum environment. The light source produces heat during operation of the source, the heat being removed by convection with air currents circulating past the light source during operation of the light source in an air environment. However, in the vacuum environment of the spacecraft, there is no air current for cooling the light source and, as a result, the temperature of the light source rises to a higher value than that present during operation in the air environment. The change in temperature alters the intensity and spectral distribution of light emitted by the source. Thus, a light source calibrated in an air environment in a laboratory may have a different radiation characteristic when operating in vacuum.

SUMMARY OF THE INVENTION

The aforementioned problem is overcome and other advantages are provided by apparatus and a process employing the apparatus, in accordance with the invention, for activating a source of light with electric current to emit radiation. The radiation is detected by use of a spectrally filtered photodetector having a fixed relationship between radiation incident upon the photodetector and photodetector current outputted by the photodetector in response to the incident radiation. Generally speaking, photodetectors are more stable in their relationship between input radiation and output electric current than are light sources in their relationship between input current and output radiation. Indeed, there are photodetectors which are stable to within hundredths of a percent of the output current, for a given input radiation intensity, over long periods of time. Several types of photodetectors have been found to have a precise linear relationship between light intensity and photocurrent with a precision within a few hundredths of a percent. Use of this characteristic of the photodetectors enables accurate spectroradiometric calibration of a radiometer or other device without reliance on the inverse square law and alteration of the distance between light source and the device under test.

In accordance with an important feature of the invention, the electric current outputted by a photodetector is monitored during illumination of the photodetector with light outputted by a light source during a calibration of the light source. The magnitude of the photodetector current serves as a measure of the intensity of the incident radiation. The invention provides for an adjusting of the intensity of the radiation emitted by the light source to attain a previously established value of photodetector current which indicates that the incident radiation has the reference value of intensity. Thereby, a known intensity of radiation is established for the light source by monitoring the photodetector current, thereby making a precisely controlled reference intensity of radiation available for calibration of spectroradiometric instruments.

In accordance with further features of the invention, the intensity of the light may be controlled by applying a fixed amount of current to the source which establishes a uniform spectral characteristic to the radiation, and by attenuating the radiation by mechanical means such as a screen or an iris to reduce the radiation intensity to a desired intensity for calibration purposes. The screen or iris would be operated in accordance with the magnitude of current outputted by the photodetector. Alternatively, the adjusting of the intensity of the radiation can be accomplished by use of a fixed iris and a variable input value of current to the light source. For operation of the light source in a vacuum environment, it is advantageous to enclose the light source and the photodetector within a housing having an open viewing port, and wherein a baffle is positioned between the photodetector and the light source to provide for a viewing of a uniform field of the radiation, produced by internal reflection within the housing, by the photodetector. The interior of a housing and the viewing port are in vacuum. By way of example, the light source may be an incandescent lamp. The electrical power applied to the light source is adjusted so as to produce the amount of photodetector current which designates the desired intensity of radiation. The entire assembly of the housing with the light source and the photodetector may be calibrated in air in a land-based laboratory for comparison to an absolute standard lamp for establishing the desired photodetector current. Thereafter, the assembly of housing, source and photodetector may be operated aboard a spacecraft in a vacuum with maintenance of the radiation accurately at the desired intensity by a monitoring of photocurrent.

BRIEF DESCRIPTION OF THE DRAWING

The aforementioned aspects and other features of the invention are explained in the following description, taken in connection with the accompanying drawing wherein:

FIG. 3 is a block diagram presenting further detail in the system of FIG. 1, and showing the use of an iris for control of light intensity;

FIG. 4 shows a mounting of a lamp and a detector within a diffusely reflecting housing to provide a source of light for calibrating the radiometric device.

DETAILED DESCRIPTION

Figure 5:
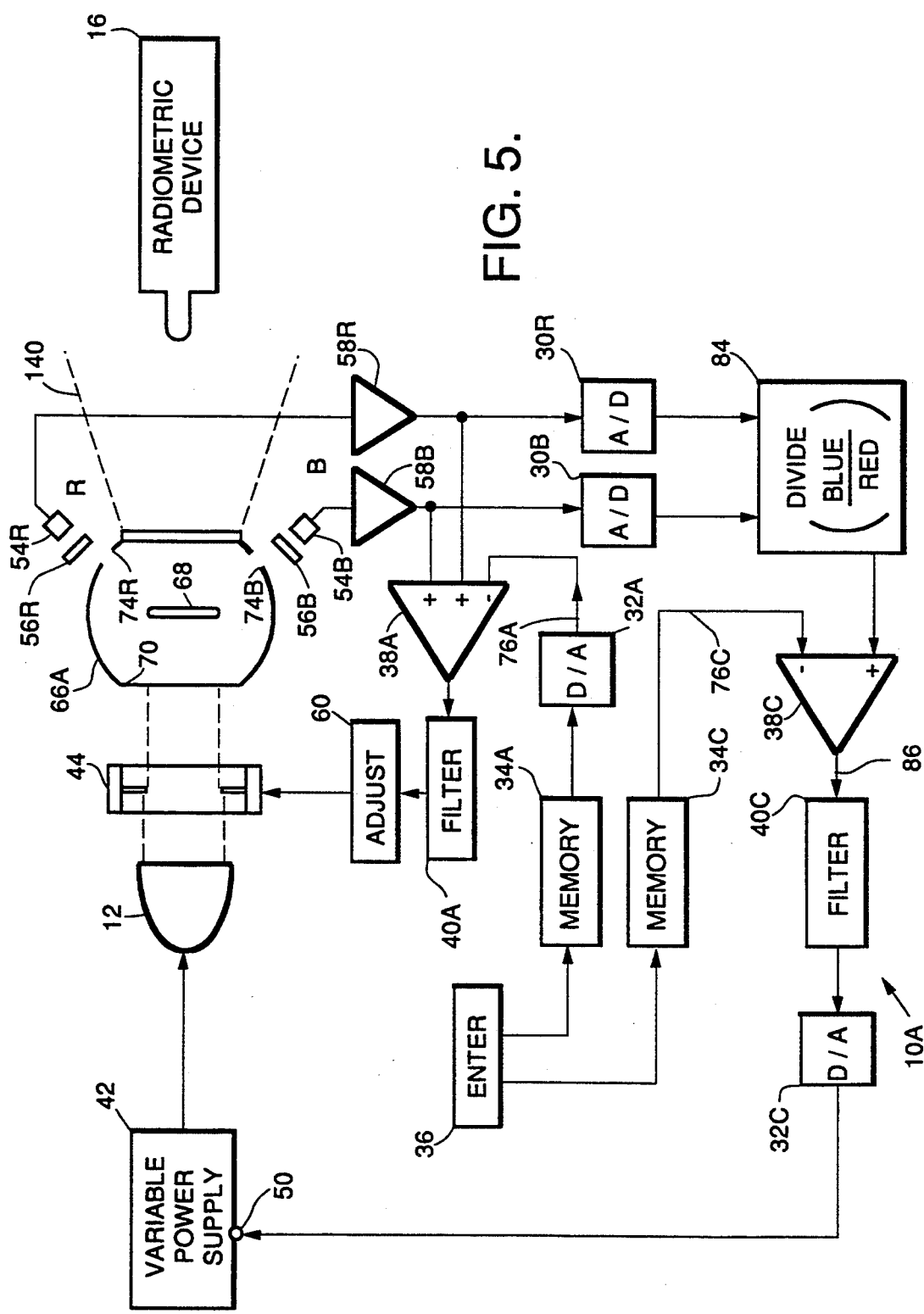
FIG. 5 is a block diagram showing further details of the system of FIG. 1 including simultaneous automatic control of both the spectral distribution of the light and the intensity of the light for accurate calibration of the radiometric device.

The invention provides for a suitable source of light which can be used to calibrate a radiometric device with radiation at various intensity levels and spectral distributions. In a preferred embodiment of the invention, the calibration source of light is a polychromatic source operative over a broad spectral region ranging from the near ultraviolet with wavelength of approximately 200 nanometers through the visible portion of the spectrum to short-wave infrared radiation with wavelength of approximately 2500 nanometers. The various embodiments of the invention allow for control of intensity of light as well as the spectral distribution of light from the calibration source. FIGS. 1-4 disclose automatic control of the intensity of the light emitted by the calibration source, while FIG. 5 shows automatic control of both the intensity and the spectral distribution of light emitted from the calibration source.

Figure 1:
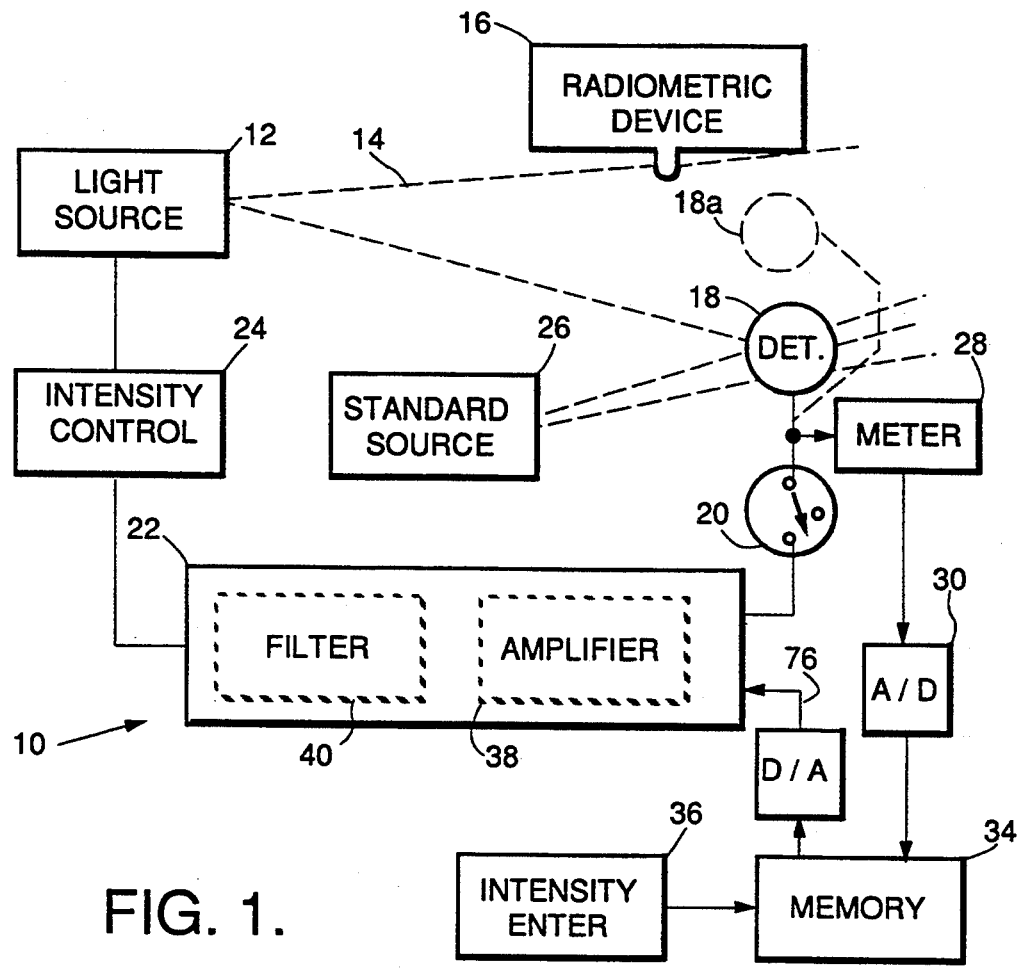
FIG 1 is a block diagram of a system for control of the intensity of light emitted by a calibration source to permit accurate calibration of a radiometric device.

With reference to FIG. 1, a calibration system 10 comprises a light source 12 which emits a beam 14 of light in a direction of a radiometric device 16 for calibrating and/or testing the device 16. A portion of the light of the beam 14 is intercepted by the device 16, and another portion of the light of the beam 14 is intercepted by a detector 18 which, in a preferred embodiment of the invention, is a photodiode. The detector 18 is to be operated with spectral filtering, as will be described hereinafter, to view one or more specific spectral bands of interest in the radiation outputted by the the light source 12. The detector 18 provides output current via a switch 20 to a control unit 22 for operating an intensity controller 24, such as a power supply or iris opening, to energize the light source 12. In the case wherein the intensity controller 24 comprises a variable source of electric power, the intensity controller 24 outputs electric voltage and current at suitable values to energize the source 12 to output light at desired intensity or spectral distribution. The system 10 further comprises a standard light source 26, an optional standard detector 18A (indicated in phantom), a current-measuring meter 28, a converter 30 of electrical signals from analog to digital format, a converter 32 of electrical signals from digital to analog format, a memory 34 storing electrical signals in digital format, and an entry device 36 permitting manual entry of data into the memory 34. The control unit 22 includes a differential amplifier 38 and a feedback-loop compensation filter 40.

An incandescent light bulb may be employed in the source 12, in accordance with a preferred embodiment of the invention. An incandescent lamp exhibits a change in the relative spectral distribution of its output as a function of the electrical power input to the lamp. The incandescent lamp is a thermal source and, to a first approximation, follows the functional form of the idealized blackbody radiation source. In the case wherein the source 12 comprises an incandescent lamp, the light intensity and spectral distribution are related in the sense that increased electrical input power and the corresponding increase in optical output power of the source 12 results in an increasing in the ratio of the intensity of higher-frequency portions of the spectrum to the intensity of lower-frequency portions of the spectrum. For example, while both blue and red light are outputted by an incandescent light bulb, and while an increase in light intensity provides for an increase of both the blue and the red spectral components of the light, the intensity of the blue light increases more rapidly than the intensity of the red light with overall increase of optical power. Hence, the ratio of intensities of the blue spectral component to the red spectral component increases with increased intensity of the light in the beam 14.

Figure 2A:
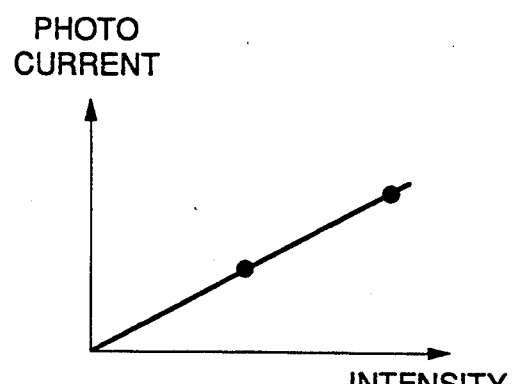
FIG. 2A shows a linear relationship between photocurrent emitted by a photodiode versus intensity of light impinging on the photodiode.
Figure 2B:
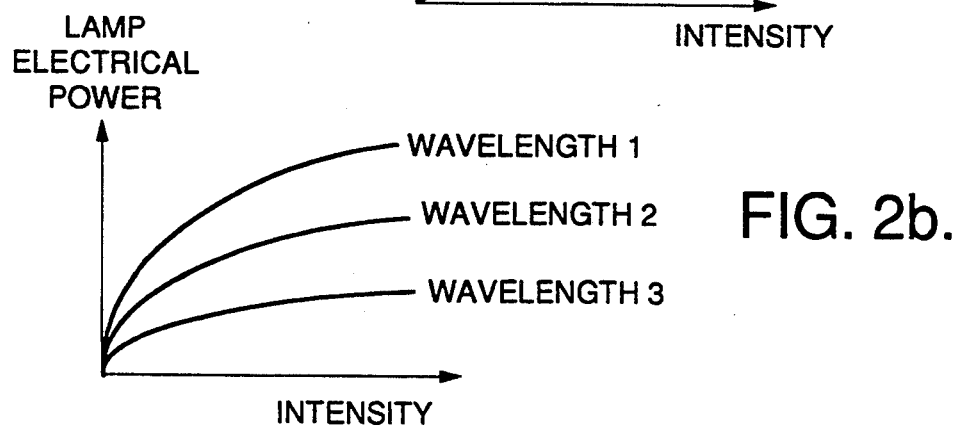
FIG. 2B shows a nonlinear relationship, at each of a plurality of radiation wavelengths, between intensity of light emitted by an incandescent lamp and electrical power inputted to the lamp.

FIG. 2A shows a linear relationship between an increase in the current outputted by the detector 18 and an increase in the intensity of the light impinging upon the detector 18. This linear relationship exists only within a relatively narrow spectral band, or portion of the illumination spectrum of the light source 12, in the case of an incandescent lamp. FIG. 2B shows a graph of required input electric power to an incandescent lamp for outputting a desired intensity of radiation as a function of the radiation wavelength, the graph presenting a nonlinear relationship for radiations at each of three different wavelengths. Thus, the photodetector current of a single detector, such as the detector 18, is an accurate predictor of the light intensity within a sufficiently narrow spectral band for characterizing the linear relationship of FIG. 2A. If there is interest in the control of radiation over a broader portion of the spectrum, two or more photodetectors may be employed to sample separate narrow spectral bands of the light outputted from the source in order to specify the relative shape of the spectrum of the emitted radiation.

The linear relationship of FIG. 2A can apply also in a wider spectral band for other types of light sources, such as fluorescent lamps and arc lamps (deuterium and xenon discharge sources), wherein the spectral distribution of emitted radiation is essentially constant over a relatively large spectral band within a limited range of changes in input electrical power to the light source. Thus, for these other types of light sources, the photodetector current of the detector 18 is an accurate predictor of the light intensity within a wider spectral band. Within this wider spectral band, a single photodetector may be used to control in a linear fashion, not only the intensity, but also the relative spectral distribution of the light outputted by the source 12.

In operation, the detector 18 outputs a photocurrent in response to light of the beam 14 impinging upon the detector 18. The meter 28 measures the current outputted by the detector 18. If desired, the intensity of the light of the source 12 may be stored by operating the switch 20 to connect the detector 18 to the memory 34 via the converter 30. The analog photocurrent is converted by the converter 30 to a digitally formatted electric signal representing the amplitude of the photocurrent for storage in the memory 34. Thus, there are two modes of entry of intensity data into the memory 34, either via the converter 30, or via the entry device 36. A desired value of intensity, previously stored in the memory 34, is outputted via the converter 32 to one input terminal of the amplifier 38 to serve as a reference signal for operation of the feedback loop of the system 10. The feedback loop is closed by operation of the switch 20 to connect the detector 18 to a second input terminal of the differential amplifier 38. Thereby, the amplifier 38 outputs to the filter 40 an electric signal proportional to the difference between the photocurrent of the detector 18 and the reference value of current supplied by the memory 34. The difference between the photocurrent and the reference current represents a loop error. The gain of the amplifier 38 is selected, in accordance with well-known feedback control, to provide a desired sensitivity of the system 10 to the loop error for controlling accurately the intensity of the light emitted by the source 12. The filter 40, which may be a lead-lag filter or low-pass filter, in accordance with well-known feedback control theory, stabilizes the operation of the feedback loop.

Calibration of the calibration source 12 may be accomplished by a procedure employing the standard reference source 26 and/or by a procedure employing the standard detector 18A. These two procedures are accomplished as follows.

To calibrate the calibration source 12 by use of the standard source 26, the detector 18 is illuminated with light from the standard source 26 in the absence of light from the source 12. The resulting photocurrent outputted by the detector 18 is stored in the memory 34 to serve as a reference signal. Subsequently, after extinguishing the light of the standard source 26, the calibration source 12 is activated, and the system 10 is operated by use of the stored reference signal from the memory 34. The photodiode of the detector 18 is substantially free of drift even with aging of the photodiode, and accurately reproduces its characteristic of photocurrent versus light intensity. Therefore, upon use of the feedback loop of the system 10, the intensity controller 24 applies suitable power to the calibration source 12 for controlling the intensity of the source 12 at a value substantially equal to the previously measured value of light intensity of the standard source 26. In the event that some other value of intensity of the calibration source 12 is desired, this is readily accomplished by entering some other value of intensity via the device 36 into the memory 34, and employing this value as the reference to the amplifier 38.

To calibrate the calibration source 12 by use of the standard detector 18A, the detector 18 is replaced by the standard detector 18A which is located at the site of the detector 18. The standard source 26 is deactivated, and the standard detector 18A is illuminated with light from the calibration source 12. The resulting photocurrent outputted by the standard detector 18A indicates the absolute radiation intensity of the calibration light source 12. Thus, the radiation intensity of the calibration source 12 is known. Then, while the calibration source 12 continues to emit light at the known intensity, the standard detector 18A is replaced with the detector 18 which now is illuminated by the calibration source 12. The detector 18 outputs a photocurrent which represents the known value of radiation intensity, the value of this photocurrent being stored in the memory 34 to serve as a reference signal. The system 10 is ready now for operation by use of the stored reference signal from the memory 34 in the same fashion as described above for the previous calibration procedure.

In FIG. 3, the function of the intensity controller 24 (FIG. 1) is provided by a variable power supply 42 and a radiation attenuator such as an iris 44. While the iris 44 will be used in a description of the preferred embodiment of the invention, it is to be understood that the diagrammatic representation of the iris 44 in FIG. 3 is understood to represent also other forms of radiation attenuators including both mechanical radiation attenuators and electrooptic radiation attenuators. Mechanical radiation attenuators include the aforementioned iris 44, and also a screen which may be adjusted for attenuating the amount of light emitted from the calibration light source 12, as well as a pair of crossed polarizer discs which may be rotated relative to each other to attenuate the radiation. The source 12 includes an incandescent tungsten lamp 46 centered within a reflector 48 such as an elliptical reflector. If desired, the tungsten lamp 46 may be filled with a gas, such as a halogen vapor. Terminals of the lamp 46 connect with the power supply 42 for receiving electric power. A terminal 50 on the supply 42 permits electrical adjustment of the output voltage in response to a control signal provided by a manually-operated signal source 52 allowing for manual selection of the supply voltage.

The detector 18 includes a silicon photodiode 54 and an optical filter 56 through which light from the source 12 is viewed by the photodiode 54. By way of example, the filter 56 may be a red filter, a blue filter, or filter of some other color. Also included within the detector 18 is an operational amplifier 58 coupled to terminals of the photodiode 54, and responsive to current outputted by the photodiode 54 for providing an output signal to the control unit 22. Thereby, the amplifier 58 senses the photocurrent and applies a signal representing the magnitude of the photocurrent to the control unit 22. To simplify the drawing, the memory 34 of FIG. 1 has been deleted in FIG. 3. An electromechanical adjustment device 60, such as a servomotor, is activated by the output signal of the control unit 22 for operating the iris 44 to enlarge or to decrease the opening 62 of the iris 44. The iris opening 62 establishes the cross-sectional dimensions of a beam 14A emanating from the calibration light source 12.

FIG. 3 includes a light-diffusion chamber incorporated in a device 64 which forms a part of the system 10, but which has been eliminated from FIG. 1 to simplify the drawing. In the diffusion device 64, the light-diffusion chamber is constructed as an integrating, or averaging, sphere 66 having a diffusely reflecting inner surface with a diffusely reflecting baffle 68 centered within the sphere 66. An inlet port 70 of the sphere 66 allows entry of light of the calibration source 12, via the beam 14A, into the sphere 66. The light undergoes multiple reflections from the interior surface of the sphere and from the surface of the baffle 68, whereupon the light exits the sphere 66 via a precision aperture 72 with a portion of the light exiting via a viewing port 74. Within the sphere 66, light is reflected randomly in all directions, in a diffuse, nonspecular fashion to exit the sphere 66, via the aperture 72, in a random fashion having no preferred direction or area from which the light is emitted. In FIG. 3, the light exiting the sphere 66 via the aperture 72 is represented diagrammatically as a diverging flux 14B of rays of radiation to the radiometric device 16 of FIG. 1. The diffusion chamber, or sphere 66, produces a light source of uniform brightness having constant radiant power per unit area per unit solid angle at each point within the exit port, namely, the precision aperture 72 of the sphere 66. Light exiting the sphere 66 via the port 74 progresses through the filter 56 to the photodiode 54. The baffle 68 prevents direct transmission of light from the inlet port 50 to the exit aperture 72, and forces the light to undergo the multiple reflections within the sphere 66 so as to ensure uniformity of optical intensity across the flux 14B. In addition, the generation of uniform intensity to the light ensures that a sample of light exiting the sphere 66 via the viewing port 74 is an accurate representation of the light transmitted via the exit aperture 72 to the radiometric device 16.

Employment of the precision aperture 72 to simulate an idealized light source of uniform brightness and known area enables the determination of the geometrical properties of the emitted light in the following situations, by way of example: (1) determination of the radiant power per unit area at the source, (2) determination of the radiant power per unit area per unit solid angle, an (3) determination of the radiant power per unit area at a fixed distance and fixed direction from a normal to the center of the plane of the aperture. These are all useful geometries for performing a radiometric calibration. This is an example of the general usefulness of the invention in industrial and laboratory applications, by way of example, as well as on board a spacecraft.

By way of example in the construction of the sphere 66, the sphere 66 may be fabricated of a metal, such as aluminum, or may be fabricated of some other base material and coated with a highly reflecting diffuse finish on the inner surface of the sphere 66. The baffle 68 may be fabricated of the same material as is used in construction of the sphere 66.

The operation of the embodiment of the invention, as disclosed in FIG. 3, follows that described above with reference to the system 10 of FIG. 1. In FIG. 3, the power supply 42 is set manually to a desired output voltage for energizing the lamp 46 to produce light having a substantially uniform spectral distribution. The light produced by the lamp 46 is collected by the reflector 48 to direct a beam of light towards the diaphragm of the iris 44 having greater power than the power necessary for calibrating or testing the radiometric device 16. The iris 44 operates to reduce the amount of optical power propagating between the source 12 in the direction of the sphere 66 to that within the beam 14A. The power of the beam 14A, apart from the losses within the integrating sphere 66, appears in the flux 14B and provides for an intensity in the flux 14B. Decreasing of the opening of the iris 44 serves to reduce the intensity of light of the flux 14B, while increasing the opening of the iris 44 serves to increase the intensity of the light in the flux 14B. The photodiode 54 of the detector 18, in conjunction with the amplifier 58, provide a measure of current representative of the intensity of the light at the aperture 72 for input to the control unit 22. The sensed intensity of the light is compared to a reference intensity by the control unit 22 to operate the adjustment device 60 for opening or closing the iris 44 to equalize the intensity of the output light to the reference value of intensity as provided by the reference signal on line 76 (shown in both FIGS. 1 and 3). Furthermore, control of the intensity of the flux 14B may be based on a specific portion of the spectrum by use of the filter 56 which, in a preferred embodiment of the invention, is a narrow-band filter such as a red or blue filter. However, if desired, the filter can be a wide-band filter to allow the photodiode 54 to respond to optical power averaged over a broad region of the spectrum rather than over a narrow region of the spectrum. The choice of filter 56 is based on the nature of the test or calibration process to be employed with the radiometric device 16, and is based also on considerations of the nature of the light source, as discussed above. For example, the light source may comprise an incandescent lamp having a narrow spectral band over which there is a linear relationship of photocurrent to lamp intensity, or may comprise a fluorescent lamp wherein the relationship extends over a much broader spectral region.

With reference to FIG. 4, the foregoing principles in the practice of the invention can also be implemented by positioning a plurality of the lamps 46 (FIG. 3) within a housing 78 (FIG. 4) constructed in a generally spherical shape and having a diffusely reflecting interior surface. As noted above, the lamp 46 is constructed as an incandescent lamp with a tungsten filament. This construction of the lamp 46 is provided by way of example, it being understood that the invention may be practiced with other forms of lamps such fluorescent lamps and arc lamps. The detector 18 is also mounted within the housing 78 and is shielded from direct view from all of the lamps by means of baffles 80 mounted on the interior surface of the housing 78 and extending radially inward. Light produced by the lamps 46 undergoes multiple reflections within the housing 78 to provide a uniform intensity of light at an exit port 82 of the housing 78. Light exiting the housing 78 via the port 82 proceeds as a flux 14C towards the radiometric device 16 for testing or calibration of the device 16. In FIG. 4, various control elements of FIG. 1, such as the intensity controller 24, the control unit 22, and the memory 34, have been eliminated to simplify the presentation. The operation of these control elements in the embodiment of FIG. 4 is understood to be the same as that which has been described above with reference to FIG. 1. The use of a spherical structure with internal diffuse reflection plus baffling, as disclosed in FIG. 4, operates in accordance with the same principles described above with reference to the diffusion device 64 of FIG. 3. Therefore, FIG. 4 serves to teach an alternative configuration of components of the system 10 with operation being in accordance with that disclosed above in the description of FIG. 1.

The embodiment of FIG. 4 is useful in the calibration of a radiometric device, such as a device 16, in outer space, such as on board a spacecraft encircling the earth. Such calibration is accomplished within a vacuum, rather than within the air environment of a laboratory on the earth. The vacuum environment induces a different behavior on components of the system than is present in the air environment. The presence of air provides for cooling of heated components by convection, such as a cooling of the lamp 46 and the reflector 48 of FIG. 3. However, in a vacuum, such a convection cooling is absent, and the temperature of the light source may increase to a greater temperature in vacuum than in air. The temperature of the source affects the intensity and spectral distribution of light emitted by the source. Therefore, calibration of the light source 12 against the standard source 26 by monitoring of photodetector current, as disclosed in FIG. 1, would result in the presence of inaccuracies upon operation of the light source in vacuum even though the electric power input is the same as in the air calibration. Greater accuracy is obtained by monitoring the photocurrent of the detector 18, in the vacuum environment, and adjusting the input electric power to the lamps 46 which results in the requisite photocurrent. The photodiode may be calibrated against the standard source 26 in an air environment for subsequent use in a vacuum environment because the photodiode retains its relationship between photocurrent and incident light intensity both in air and in vacuum. The embodiment of FIG. 4 is particularly convenient for operation in a vacuum because the housing 78 provides for radiational cooling of the lamps 46 and other components located within the housing 78. Thereby, the accuracy of the calibration in the air environment of the plurality of lamps 46 performed initially in a land-based laboratory is maintained upon transfer of the equipment to an extraterrestrial spacecraft.

FIG. 5 shows a system 10A which is a modification of the system 10 of FIG. 1, the system 10A of FIG. 5 providing for control of both the spectral distribution of light of the calibration source 12 concurrently with control of the intensity of the light of an output flux 14D impinging on the radiometric device 16. Components used in construction of the system 10A include a divider 84 and other components which have been described already with reference to FIGS. 1 and 3. Thus, input electric power to the calibration light source 12 is provided by the variable power supply 42 in response to an electric signal applied to terminal 50, and the amount of power extracted from the source 12 is limited by the iris 44 under control of the adjustment device 60. The sphere 66 (FIG. 3) is replaced in FIG. 5 with a sphere 66A having the same construction as the sphere 66 except for the inclusion of an additional viewing port. Thus, the sphere 66A has two viewing ports 74B and 74R for viewing a blue spectral component and a red spectral component, respectively, in a manner to be described. Light of the calibration source 12 coupled via the iris 44 enters the sphere 66A via input port 70, undergoes diffuse internal reflection upon the internal surface of the sphere 66A and on the surface of the baffle 68, and exits the sphere 66A via precision aperture 72 in the same manner as has been described with reference to the sphere 66 of FIG. 3. In FIG. 5, an output flux 14D of light from the precision aperture 72 illuminates the radiometric device 16.

In accordance with a feature of this embodiment of the invention, two photodiodes 54B and 54R are employed with two optical filters 56B and 56R, respectively, for viewing light via the ports 74B and 74R concurrently. The construction and operation of the photodiodes 54B and 54R, and of the filters 56B and 56R are the same as that disclosed above with reference to the photodiode 54 and the filter 56 of FIG. 3. Output photocurrent of the photodiodes 54B and 54R are sensed by amplifiers 58B and 58R, respectively, the amplifiers 58B–R having the same construction and operation as disclosed above for the amplifier 58 of FIG. 3. The filter 56B is a narrow-band filter which passes only the blue spectral component of the light within the sphere 66A to the photodetector 54B. Similarly, the filter 56R is a narrow-band filter which passes only the red spectral component of the light within the sphere 66A to to the photodiode 54R. The amplifiers 58B–R output signals proportional to the photocurrents of the photodiodes 54B–R, respectively to two input terminals of differential amplifier 38A concurrently. The amplifier 38A functions in a manner analogous to that of the amplifier 38 of FIG. 1. The amplifier 38A of FIG. 5 sums together the signals outputted by the amplifiers 58B–R to provide a sum signal representative of the intensity of the light of the flux 14D, and compares the sum signal with a reference signal on line 76A representative of a reference intensity. The reference signal on line 76A corresponds to the reference signal on line 76 of FIG. 3, and is employed in the same fashion as the reference signal on line 76 of FIG. 3 for controlling the iris 44 of FIG. 5 to output a desired intensity in the flux 14D.

In operation, the output signal of the differential amplifier 38A is applied via a filter 40A to operate the adjustment device 60 for control of the aperture 44. The filter 40A, as well as a further filter 40C, are constructed and operate in the same fashion as has been disclosed above for the filter 40 of FIG. 1. Also, in FIG. 5, two memories 34A and 34C are provided, the memories 34A–C having the same construction and operation as disclosed above with reference to the memory 34 of FIG. 1. The entry device 36 permits manual entry of data into either one of the memories 34A and 34C. The memory 34A stores a reference value of intensity of the flux 14D in digital format, a signal outputted by the memory 34A being converted from digital-to-analog format by a converter 32A to provide the reference signal on line 76A for operation of the amplifier 38A. The converter 32A as well as a further converter 32C of FIG. 5 have the same construction and operation as disclosed above for the digital-to-analog converter 32 of FIG. 1. Also provided in the circuitry of FIG. 5 are two analog-to-digital converters 30B and 30R which function in the same manner as the converter 30 of FIG. 1.

In accordance with the feature of the invention for control of the spectral distribution of the light on the flux 14D, as shown in FIG. 5, the output photocurrent signals of the amplifiers 5SB-R are converted from analog format to digital format by the converters 30B-R, respectively, and applied to input terminals of the divider 84 which forms the ratio of the two photocurrent signals. The ratio represents the amplitude of the blue component divided by the amplitude of the red component. The color ratio is outputted by the divider 84 to a differential amplifier 38C which functions in the same fashion as the amplifier 38 of FIG. 1. In FIG. 5, the amplifier 38C receives a reference signal via line 76C from the memory 34C and compares the color ratio to the reference signal to output a loop error signal on line 86 to the filter 40C. The loop error signal on line 86 represents the diversion of the spectral distribution of light in the output flux 14D from a desired spectral distribution of light previously entered into the memory 34C via the entry device 36. The error signal on line 86 is filtered by the filter 40C and then converted from digital format to analog format by the converter 32C. The analog signal outputted by the converter 32C is applied to terminal 50 of the power supply 42 for increasing or decreasing the electric power applied to the calibration light source 12 for correction of the spectral distribution of its light. With respect to the operation and construction of the differential amplifier 38C, the operation, as noted above, is the same as that of the amplifier 38 of FIG. 1; however, the amplifier 38C is constructed to operate with digitally formatted signals. Also, the divider 84 is constructed to operate with digitally formatted signals.

By way of alternate construction, the divider 84 could be constructed of analog circuitry in which case the signals of the amplifiers 58B-R would be applied directly to the divider 84 without use of the converters 34B-R. With such analog construction, the amplifier 38 C would be constructed also of analog circuitry, the filter 40C would be constructed of analog circuitry, and the output signal of the filter 40C would be applied directly to the power supply 42 without use of the converter 32C. The digital construction, as shown in FIG. 5, is preferred because of the ready availability of digital microcomputers for performing functions such as digital storage, division, filtering, summation and subtraction. The amplifier 38A and the filter 40A are constructed in analog fashion. However, if desired, the amplifier 38A and the filter 40A could be constructed in digital fashion in which case the blue and the red input signals to the amplifier 38A would be taken from output terminals of the converters 30B and 30R. The principles of the invention apply irrespectively of which construction, analog or digital, is employed in construction of the system 10A.

It is noted that control of the iris 44 via an error signal of the amplifier 38A, and control of the electric power of the source 42 via an error signal outputted by the amplifier 38C constitute two separate feedback loops for control of the light of the source 12. The two feedback loops operate concurrently. The loop operative with the iris 44 affects only the intensity of the light without affecting the spectral distribution of the light. However, the loop operative with the power supply 42 affects both the intensity and the spectral distribution of the light. As has been described above, an increase of electric power inputted to the calibration source 12 results in an increase of the blue spectral component to a greater extent than the increase in the red spectral component. Therefore, in any adjustment of the ratio of these two components, there must necessarily be a change in the total optical power outputted by the source 12. Such change in optical power must be compensated by operation of the iris 44.

In order to enable both of the feedback loops to operate without mutual interference, the spectral control loop which operates the power supply 42 is provided with a relatively slow dynamic response by the filter 40C. In contrast, the loop which operates the iris 44 is provided with a relatively fast dynamic response by the filter 40A. Preferably, the response time of the loop operating the iris 44 is at least ten times faster than the the response time of the loop operating the power supply 42. By way of example, the loop operating the power supply 42 may have a time constant, or response time, of one second, and the loop operating the iris 44 may have a time constant, or response time, of one-tenth second. This relationship among the two dynamic responses ensures that the intensity control of the iris 44 will be able to follow any variation in intensity brought on by operation of the spectral control. Thereby, both of the feedback loops operate in stable fashion.

By way of alternative embodiments to the invention, it is to be understood that the assessment of the spectral distribution by use of the blue and red filters 56B-R of FIG. 5 can be accomplished also by examination of still further frequency or color bands of the light. By way of example, a green filter with a further photodiode (not shown) may be employed to obtain a color ratio of the green light intensity divided by the red light intensity. The two color ratios of green divided by red and blue divided by red would then be averaged and applied to the amplifier 38C of FIG. 5, in lieu of the single color ratio (Blue divided by red) of FIG. 5. The output signal of the amplifier 38C on line 86 would then represent the differential spectral distribution of the average of a plurality of color ratios compared to the reference signal on line 76C.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method of establishing intensity and spectral distribution of radiation emitted by a light source comprising:

activating a light source with electric current to emit radiation;

simultaneously detecting the radiation in a plurality of frequency bands with photodetector means having a fixed relationship between radiation incident upon the photodetector means and photodetector current outputted by the photodetector means in response to the incident radiation;

monitoring current outputted by the photodetector means in response to radiation incident upon the photodetector means from the light source, said monitoring providing an indication of radiation intensity at each of said plurality of frequencies, said monitoring providing an indication of an actual spectral distribution of the radiation;

comparing said actual spectral distribution with a reference spectral distribution to obtain a differential distribution of the radiation;

altering the actual spectral distribution of said radiation to decrease and/or increase said differential distribution; and adjusting the intensity of the radiation to produce a reference value of photodetector current, the reference value of photodetector current indicating a reference value of radiation intensity.

2. A method according to claim 1 wherein said step of altering the actual spectral distribution produces an alteration of power outputted by the light source; and
said step of adjusting includes a step of attenuating the radiation, to compensate for the power alteration, by a radiation attenuator to attain the reference value of radiation intensity.

3. A method according to claim 2 wherein said radiation attenuator of said attenuating step is drawn from the class of radiation attenuators consisting of irises, screens, crossed-polarizers and electrooptic devices.

4. A method according to claim 1 wherein said monitoring step is accomplished by dividing a value of radiation intensity in a first of said frequency bands by a value of radiation intensity in a second of said frequency bands to obtain a measure of the actual spectral distribution in terms of a color ratio, said reference distribution being in terms of a reference color ratio.

5. A method according to claim 1 wherein said step of altering the actual spectral distribution includes a step of varying excitation current applied to the light source to establish said reference distribution of radiation.

6. A method according to claim 1 further comprising, prior to said detecting step, a step of averaging radiation via an optical diffusion chamber to obtain uniformity of radiation intensity.

7. A method according to claim 6 further comprising a step of providing said diffusion chamber with a precision aperture at an output port of said diffusion chamber for enabling said diffusion chamber to serve as an idealized light source of uniform brightness and known area for determination of radiant power per unit area and radiant power per unit solid angle.

8. A system for establishing intensity and spectral distribution of radiation emitted by a light source comprising:
means for energizing the light source with electric current to emit radiation;
photodetector means for detecting the radiation in a plurality of frequency bands, said photodetector means having a fixed relationship between radiation incident upon said photodetector means and photodetector current outputted by said photodetector means in response to the incident radiation;
means for simultaneously monitoring current outputted by said photodetector means in response to radiation incident upon said photodetector means from the light source, said monitoring means providing an indication of radiation intensity at each of said plurality of frequencies of an actual spectral distribution of the radiation, said actual spectral distribution being dependent on an amount of power inputted to the light source by said energizing means;
means for comparing said actual spectral distribution with a reference spectral distribution to obtain a differential distribution of the radiation;
altering means for activating said energizing means to alter the actual spectral distribution of said radiation to decrease and/or increase said differential distribution; and
means for adjusting the intensity of the radiation to produce a reference value of photodetector current, the reference value of photodetector current indicating a reference value of radiation intensity.

9. A system according to claim 8 wherein said altering of the actual spectral distribution produces an alteration of power outputted by the light source; and
said adjusting means includes a radiation attenuator for altering intensity of the radiation, to compensate for the power alteration, to attain the reference value of radiation intensity.

10. A system according to claim 9 wherein said radiation attenuator is an iris.

11. A system according to claim 9 wherein said radiation attenuator is a screen.

12. A system according to claim 9 wherein said radiation attenuator is a crossed polarizer.

13. A system according to claim 9 wherein said radiation attenuator is an electrooptic device.

14. A system according to claim 8 wherein said monitoring means comprises means for dividing a value of radiation intensity in a first of said frequency bands by a value of radiation intensity in a second of said frequency bands to obtain a measure of the actual spectral distribution in terms of a color ratio, said reference distribution being in terms of a reference color ratio.

15. A system according to claim 8 further comprising means including an optical diffusion chamber for averaging radiation to obtain uniformity of radiation intensity, prior to presenting the radiation to said detecting means, a portion of the radiation exiting said averaging means in a direction away from said detecting means to serve for calibration of an external radiometric device.

16. A system according to claim 15 wherein said diffusion chamber includes an exit port through which radiation exits said diffusion chamber for propagation in a direction towards said detecting means, said averaging means further comprising a precision aperture located at said exit port for determination of radiant power per unit area and per unit solid angle of radiation propagating through said aperture.

* * * * *